Jan. 25, 1966
W. J. PETERSON
3,230,554
MOTION REGULATOR
Filed March 26, 1962
2 Sheets-Sheet 1
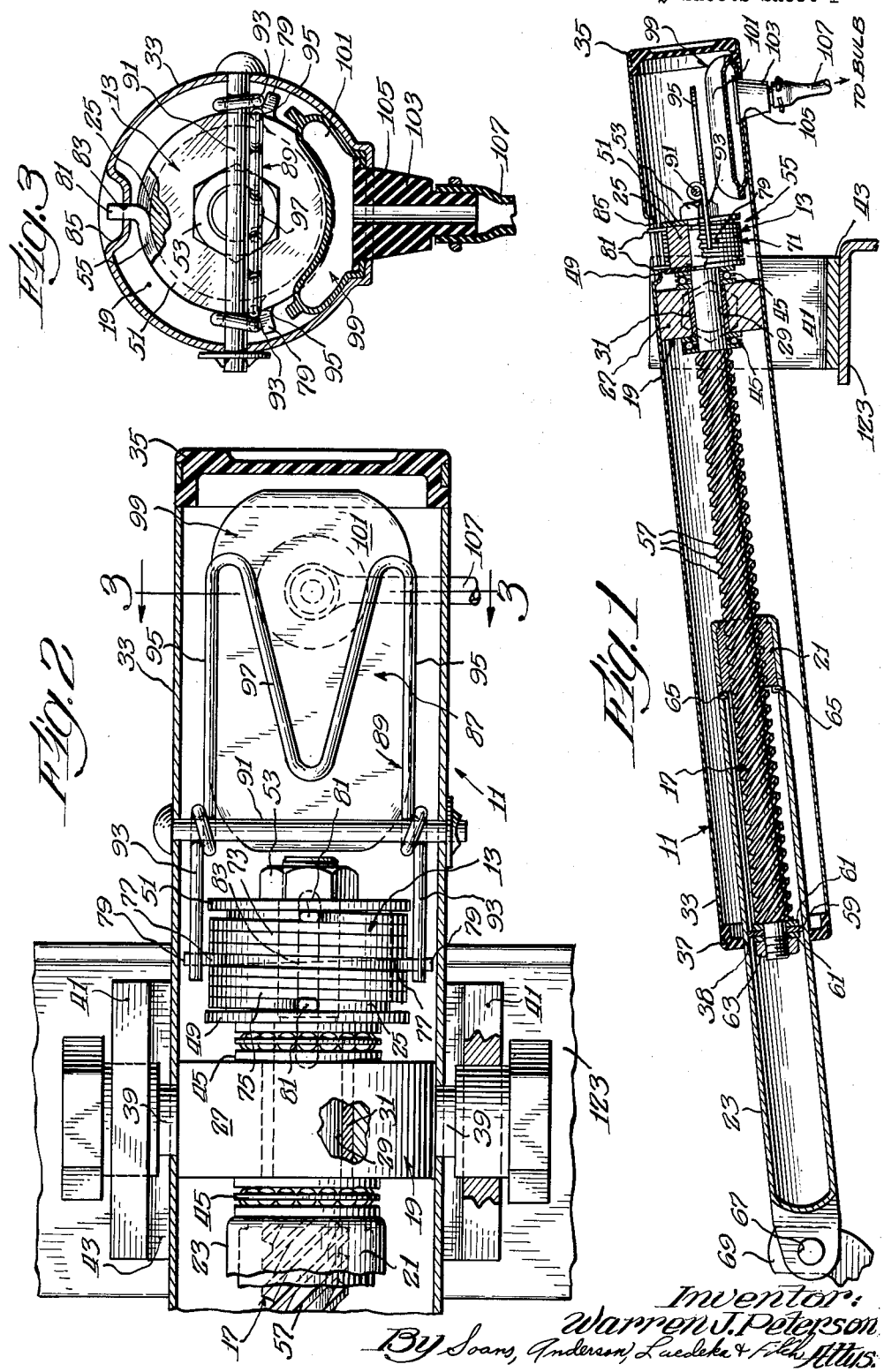
Inventor:
Warren J. Peterson
By Soans, Anderson, Luedeka & Fish, Attys.

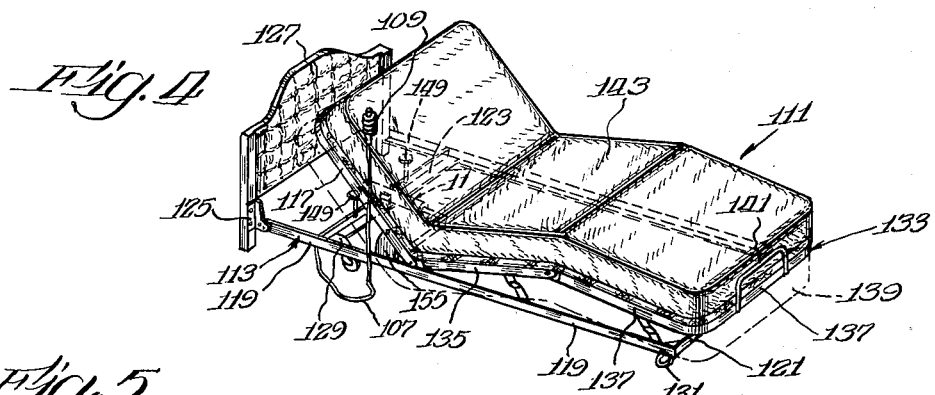

United States Patent Office 3,230,554
Patented Jan. 25, 1966

3,230,554
MOTION REGULATOR
Warren J. Peterson, Highland, Ind., assignor to Simmons Company, New York, N.Y., a corporation of Delaware
Filed Mar. 26, 1962, Ser. No. 182,360
9 Claims. (Cl. 5—66)

This invention relates to motion-regulating devices, i.e., to devices adapted to control the relative movement of two bodies or entities.

The invention also relates to the application of such devices to adjsutable beds, chairs and the like to regulate relative movement between various sections thereof.

The principal object of the present invention is to provide an improved motion-regulating device.

A further object of the invention is to provide such a device which can be embodied in adjustable furniture and regulated manually by the occupant to control the reglative movement between certain elements of the furniture.

A still further object of the invention is to provide an improved adjustable bed embodying such a device as a means for regulating pivotal movement of certain of the body-supporting sections of the bed.

Other objects and advantages of the invention will become apparent with reference to the following description and accompanying drawings.

In the drawings:

FIGURE 1 is a central longitudinal sectional view, taken in vertical plane, of a motion regulating device in accordance with the present invention;

FIGURE 2 is a fragmentary plan view, partially broken away, of the device of FIGURE 1;

FIGURE 3 is a sectional end view taken along line 3—3 of FIGURE 2;

FIGURE 4 is a perspective view of an adjustable bed embodying the device shown in FIGURES 1–3;

FIGURE 5 is a plan view of the frame of the bed of FIGURE 4;

FIGURE 6 is a side view showing the bed of FIGURE 4 in the sleeping position; and FIGURE 7 is a side view of the bed of FIGURE 4 as it appears with the bed head section in raised position.

The motion-regulating device hereinafter described is adapted to be utilized in a mechanical system in which two elements are relatively movable and in which control is sought for such movement. The regulating device comprises generally an extensible and contractable strut 11 having interengaged mechanical elements which convert the essentially linear extensile and contractile motion of the strut into rotary motion of one of the interengaged mechanical elements; a brake 13 for retarding or preventing such rotary motion; and remotely operable means for controlling the brake. When the strut is connected between two bodies in such a way as to be extended or contracted by their relative movement, the device as a whole serves to control such relative movement.

The motion regulating device of the invention is hereinafter illustrated in its application to the control of the pivotal movement of the body-supporting sections of an adjustable bed, thereby suggesting its broader application to adjustable furniture of all types, and to other applications as well.

In the illustrated embodiment, the interengaged mechanical elements of the strut 11, which convert its linear extension and contraction to rotary motion, are a threaded shaft 17 mounted for rotary motion in a bearing 19 secured to one of the relatively movable bodies, and a nut 21 engaged with the threaded shaft and secured within a tube 23 held against rotation by its connection to the other body. Relative movement of the two bodies toward or away from one another causes an endwise thrust to be exerted on the nut 21 which, because of the lead of the thread, produces rotation of the shaft.

The brake assembly 13, normally engaged with a drum 25 secured to the screw 17, secures the screw against rotation in either direction but is releasable by pneumatic connection to the hand of the remote operator, in the illustrated case, the occupant of the bed.

The bearing 19 is formed from a cylindrical bearing block 27 provided with an axial hole 29 lined with a bushing 31 of nylon or the like. The bearing is carried within, and is coaxial with, an elongated tubular housing 33, and is disposed along the length of the housing so as to be nearer to one end thereof, this end being hereinafter referred to for convenience of reference as the rearward end of the housing. The housing is closed at the rearward end by a cap 35 and is partially closed at its forward end by an end collar 37, through the opening 38 of which the nut tube 23 slides during its operation.

A pair of shoulder bolts or trunnions 39, inserted through holes in the housing 33 and diametrically into the bearing block 27 from opposite sides thereof, are pivotally mounted in the upstanding arms 41 of a U-shaped bracket 43 secured to one of the relatively movable elements of the system as, for example, the underframe of an adjustable bed. Pivotal mounting of the housing is necessary if the relative motion between the elements has a component in more than one direction, such as when one element is moving toward or away from the other in an arc, or in a straight line which is not collinear with the axis of the shaft.

The shaft 17 extends into the housing 33 from the forward end thereof and is journalled in the bearing 19 so that a portion of the shaft extends rearwardly of the bearing. A thrust bearing 45 is secured to the shaft on each side of the bearing block 27 and prevents axial movement of the shaft 17 when a force is exerted on the nut 21. A cylindrical brake drum 25 is secured to the portion of the shaft extending rearwardly of the bearing block, and is provided with a radial flange 49 at its forward end. A washer 51, having a diameter substantially equal to that of the flanged forward end of the drum 25, is secured against the rearward end of the drum by a locking nut 53 threaded on the rearward end of the shaft. The flange 49 and washer 51 serve to maintain the assembly of brake elements 55, not yet described, on the cylindrical surface of the drum.

That portion of the shaft intermediate its forward end and the bearing block 27 is provided with multiple external threads 57 and carries the nut 21 during its travel along the shaft. The threads 57 have sufficient lead that a thrust upon the nut 21 in a direction axially of the shaft moves the nut axially of the shaft and causes the shaft to rotate.

A washer 59 of nylon or the like is disposed around the shaft adjacent the forward end thereof intermediate a pair of metal washers 61 of lesser dimeter, and is held in place by a lock nut 63 secured to the forward end of the shaft by conventional threads. The washer 59 serves as an internal guide for the nut tube 23 which encircles the shaft and is coaxial therewith.

The nut 21 is seated against ears 65 struck inwardly from the walls of the tube 23 near its reaward end, and the end of the tube is rolled or swaged about the nut to secure it against axial and rotational movement in the tube. The tube, of course, moves inwardly and outwardly of the housing 33 as the nut 21 moves axially of the shaft 17, and is guided in its movement by the forward collar 37 and by the nylon washer 59 on the screw shaft.

The nut tube 23 is somewhat longer than the threaded portion of the shaft so that it will project outwardly of the housing 33 even when the nut has reached its innermost point of travel along the shaft, and the outermost end of the tube is flattened and provided with an opening 67 to facilitate pivotal attachment thereof to a lug 69 suitably mounted on the second element of the structure as, for example, a movable section of an adjustable bed.

Axial thrust upon the tube 23, inwardly and outwardly of the housing 33, urges the nut 21 along the threaded portion of the shaft 17, thereby tending to cause the shaft and, hence, the brake drum 25 secured to the shaft, to rotate. It should be apparent, therefore, that movement between the elements to which the tube and housing 33 are connected, can be regulated by suitably controlling the rotation of the shaft. Such control is accomplished by the brake assembly 13, previously referred to, which includes a spring assembly 71 disposed around the brake drum 25 and capable, when engaged with the drum, of preventing rotation of the shaft.

The spring assembly 71, comprising in the illustrated embodiment, a pair of springs 73 and 75 in the form of helices cylindrical in shape and formed of resilient bands of flat wire wound on edge, has an inner diameter somewhat smaller than the outer diameter of the brake drum 25. Each spring is wound so as to include several complete wraps plus a three-quarter wrap 77 at one end, and each of the bands is bent outwardly at its ends to provide a pair of outwardly projecting lugs 79 and 81. Since one of the lugs 79 is located at the end of the three-quarter wrap 77, the lugs of each spring will be spaced approximately 90 degrees from one another. Thus, relative movement between the lugs of either spring which tends to increase the angle separating them will tend to partially unwrap the helix and decrease the frictional hold of the spring on the drum. The springs 73 and 75 are fitted over the outer surface of the drum by expanding them in the above-mentioned manner and, when the pressure separating the lugs 79 and 81 is released, the helices contract and intimately engage the outer surface of the brake drum 25. The lugs 81 of the two springs, one at each end of the drum 25, are aligned and keyed to the housing tube 33 in a slot 83 provided in a downwardly embossed portion 85 thereof adjacent the brake drum. The other lugs 79 of the two helices project sidewardly from opposite sides of the drum.

With the springs so disposed, rotation of the shaft in the counterclockwise direction (FIG. 3) causes the rearwardmost spring 73 to wrap itself more tightly around the drum 25, since the then trailing end of that spring is keyed to the housing by its lug 81. The increased frictional grip of the rearwardmost spring prevents the shaft from turning in that direction. The other spring has no effect upon counterclockwise movement since its trailing end, relative to such movement, is unanchored. With respect to clockwise rotation, however, the forwardmost spring 75 controls, since its end which trails relative to clockwise movement is anchored by its lug 81 so that clockwise rotation increases the frictional grip of the forwardmost spring 75, braking movement in that direction, whereas the rearwardmost spring 73, whose end which trails with respect to clockwise movement is unanchored, is ineffective.

As each end of each spring is alternately leading or trailing, depending upon the direction of rotation of the drum 25, a single spring, if anchored alternately on its alternately trailing end, would brake the drum 25 in either direction. In such a structure, however, a certain amount of "play" or "slop" is necessary to permit each end of the spring to move between an anchored and an unrestrained position. In the illustrated arrangement, therefore, two springs are employed, which are wrapped reversely with respect to their permanently anchored ends, so that one spring restrains rotary movement of the drum in one direction and the other prevents rotary motion in the opposite direction. In that manner, downward movement of the laterally projecting lugs 79 at the free ends of the springs will tend to expand them sufficiently to release the drum for rotation in either direction. Theoretically, it is not necessary to provide for pay or slop in the two-spring system.

An actuating mechanism 87 which releases the brake springs 73 and 75 is disposed adjacent the rearward end of the housing 33 and includes a lever 89 pivotally mounted on a horizontal bolt 91 extending transversely of the housing. The lever 89 is formed of heavy wire looped around the pivot bolt 91 adjacent each end thereof so as to provide a pair of arms 93 extending forwardly of the pivot bolt along opposite sides of the brake drum 25, to overlie the laterally projecting lugs 79 of the springs, and a second pair of arms 95 extending rearwardly toward the rear closure cap 35. The rearwardly extending arms 95 of the lever 89 are interconnected by an integral V-shaped portion 97 to provide greater contact surface with a pneumatic actuator 99, still to be described. When the rearwardly directed arms 95 are rocked upwardly, the forwardly directed arms 93 are rocked downwardly, thereby rocking the laterally projecting lugs 79 downwardly, "opening" or increasing the inner diameter of the springs 73 and 75 to release the drum.

The rocking movement of the lever arms 93 and 95 is accomplished in the illustrated embodiment, by an inflatable bladder 101 disposed within the housing in underlying relation to the rearwardly directed arms 95 of the lever 89 so that when the bladder 101 is inflated, it will engage these arms and their V-shaped connecting portion and rock them upwardly. A nipple 103 extends from the bladder outwardly of the housing through an opening 105 in the lower wall thereof and has secured thereto a hose 107 which interconnects the bladder with a manually compressible bulb 109. While the bulb may take any suitable form, it is preferably formed to provide bellows, as shown, to facilitate operation by the thumb when held in the other fingers of the hand. The volume of the bulb and operating bladder need not be great inasmuch as a relatively small movement of the spring lugs 79, and hence the lever 89, is sufficient to "release" or to prevent the tightening of the springs 73 and 75, in order to permit the drum 25 and screw-shaft 17 to rotate.

If desired, the pneumatic system may be provided with a suitable check valve (not shown) which may conveniently be located in either the bulb or the bladder, and which normally opens the system to the atmosphere, but closes when the bulb is compressed.

From the foregoing, it should be apparent that, with the brake normally engaged, the shaft 17 will not rotate in either direction and, consequently, no movement of the nut tube 23 inwardly and outwardly of the housing, i.e., contraction or extension of the strut 11, is possible. However, when the bulb 109 is compressed, the lever 89 disengages the brake and permits movement of the nut 21 in either direction and, accordingly, relative movement of the two elements of the system controlled.

The motion-regulating device which has been described may, of course, be used in a number of applications, but is particularly useful when embodied in adjustable furniture such as adjustable seats, or chairs and beds having adjustable body-supporting sections. When used with an adjustable bed, for example, the device allows movement of the controlled sections to an infinite number of supporting positions and is effective to lock the sections in any desired position. In such an application, remote manual operation of the device by means of the compressible bulb is particularly advantageous.

Such an adjustable bed 111 (FIGS. 4–7) may comprise an underframe 113 having mounted thereon an articulated body-supporting platform 115, including a head section 117 movable to different supporting positions. The housing 33 of the regulating strut 11 is carried on the underframe 113 and the nut tube 23 of the regulating device is pivoted to the head section 117 such that upward movement of the section relative to the underframe will tend to move the tube inwardly of the housing. Such movement will be possible, of course, only if the brake of the device is disengaged by compressing the bulb 109. Since the brake may be engaged so as to provide the device with an infinite number of fixed positions, the device is therefore effective in maintaining the body-supporting platform 115 in an infinite number of supporting positions between the ultimate limits of its travel.

More specifically, the underframe 113 of the bed 111 includes a pair of angle iron side rails 119 connected by a pair of angle iron cross rails 121 and 123 to form a generally rectangular frame, with the side rails 119 extending headwardly beyond the cross rail 123, and provided with brackets 125 for the attachment of a headboard 127. Corner plates 129 stiffen the frame and provide points of attachment for casters 131 upon which the underframe is supported.

The body-supporting platform 115 carried by the underframe 113 includes a generally rectangular angle iron border frame 133 jointed along its sides to divide the platform into three hingedly connected sections, the head section 117, an intermediate section 135, and a foot section 137. Each section may be provided with a skirt 139 of padded boards to give it a box-like appearance, and the foot section is provided with an upstanding U-shaped bracket 141 to prevent sliding of the mattress 143 as the sections are adjusted.

Inbowing of the sides of the border frame 133 under the weight of the mattress 143 and the occupant, is prevented by spreader bars 145, 147 and 151 which extend between the sides of the border frame in each section and are desirably fabricated of metal tubing formed so as to be U-shaped or downwardly bowed so as not to interfere with downward deflection of a bed fabric, not shown, but which may be in more or less conventional wire link form, stretched on the border frame by helicals.

The spreader bar 147 located in the head section, is positioned to engage stop posts 149 extending upwardly from the cross rail 123 to arrest downward movement of the head section 117 in the horizontal position.

The head section 117 is pivotally supported on the underframe 113 upon a pair of opposed upstanding brackets 155 fixedly secured at their lower ends to the underframe side rails 119. The head section is pivotally attached to the upper ends of the brackets 155 adjacent its hinged connection to the intermediate section 135, and with a larger portion of the head section extending from the brackets toward the headboard 127 in cantilever fashion.

The intermediate section 135 is supported adjacent its rearward end by its hinged connection to the head section, and at a point nearer the foot section by shiftable links 157 pivotally connected at their lower ends to the side rails of the underframe and at their upper ends to the border frame 133 of the intermediate section. It may thus be seen that the intermediate section 135 moves between a horizontal position (FIG. 6) and an inclined position (FIG. 7) in response to movement of the head section 117 through a definite path determined by its connection to the head section and to the shifting links 157.

The foot section 137 is supported at one end by its hinged connection to the intermediate section 135 and adjacent its other end by shiftable links 159 pivoted to the border frame 133 and the underframe 113 respectively.

When the head section 117 is horizontal, the intermediate section 135 and foot section 137 are also horizontal and aligned with the head section. As the head section is raised, the intermediate and foot sections follow the movement of the head section until the bed bottom assumes a chair-like attitude, the joint between the head and intermediate sections breaking downwardly, and the joint between the intermediate and foot sections breaking upwardly (see FIG. 7).

The motion regulating strut 11, earlier described, is connected between the underframe 113 and the head section 117 of the bed. Specifically (see FIGS. 4 to 7) the upstanding U-shaped mounting bracket 43, in which the trunnions 39 of the strut are pivoted, is secured to the cross rail 123. The hose 107 extends from the strut along the cross rail, to which it is anchored at spaced points by suitable clips 161, to place the hand bulb 109 within convenient reach of the occupant adjacent the intermediate section 135. The end of the nut tube 23 is pivoted to the lug 69 secured, as by welding, to the spreader bar 151.

As the head end 117 of the bed platform 115 swings upwardly (FIG. 7) the spreader bar 151 swings toward the headboard 127 as well as downwardly, thus contracting the strut 11. Reverse movement of the head end of the platform 115 accordingly extends the strut.

Because the head section 117 is pivotally supported between its ends, the foregoing movements, when permitted by the regulator are accomplished by the occupant of the bed by appropriately concentrating his weight thereon. For example, the bed may be moved to a position in which the head section 117 is raised by compressing the bulb 109 and sitting on the edge of the bed at a point approximately above the hinged connection between the head section and the intermediate section 135, or by rising from a prone to a sitting position on the bed so as to place the weight of the occupant at a point approximately above the axis about which the two sections are hinged. The head section may also be raised, of course by standing adjacent the bed and raising the section manually while the brake of the regulating strut 11 is disengaged.

The head section may be moved by the bed occupant from the raised position to the horizontal position by disengaging the brake, i.e., compressing the bulb 109, and leaning back against the head section or, of course, by lowering the section manually while standing next to the bed. It will be further apparent that motion in either direction may be arrested at any one of an infinite number of intermediate positions by releasing the bulb to reset the brake.

The bed thus provided is particularly adapted to use for home use by invalids or semiinvalids, but also for use of those who prefer an adjustable bed as for reading or lounging in bed. Whether employed in a bed or other item of adjustable furniture, or in other systems, the motion-regulating device described provides convenient and infinite control, with prescribed limits, and is controllable by a manually-operated compressible bulb which can be located at any practicable remote point.

While a particular embodiment of the invention has been disclosed, it should be apparent that various modifications may be made therein without departing from the scope of the invention as set forth in the following claims.

What is claimed is:

1. A device for controlling the relative movement of two elements of a mechanical system, said device comprising a threaded shaft journalled on one of said two elements, said shaft having a cylindrical surface, a nut carried on the threaded portion of the shaft and connected to the other of said two elements, movement of one of said elements toward or away from the other being effective to move said nut axially of said shaft and cause rotation of said shaft, a brake element comprising a pair of helically wound bands of resilient material disposed about said cylindrical surface so as to snugly engage the same, means engaging an end of each of said bands to anchor the same against rotation the relative disposition of said bands being such that each advances from its anchored end along said surface in a direction opposite to that of the other, whereby rotation of said surface in either direction winds one of said bands more tightly about said surface, a movable element engageable with the other end of each of said bands to tend to unwind the same to release the grip thereof upon said surface, and a manually controlled operator for actuating said movable element to tend to unwind the bands.

2. A device for controlling the relative movement of two elements of a mechanical system, said device comprising a threaded shaft journalled on one of said two elements, said shaft having a cylindrical surface, a nut carried on the threaded portion of the shaft and connected to the other of said two elements, movement of one of said elements toward or away from the other being effective to move said nut axially of said shaft and cause rotation of said shaft, a brake element comprising a helically wound band of resilient material disposed about said cylindrical surface so as to snugly engage the same, means engaging an end of said band to anchor the same against rotation and to cause rotation of said surface to wind said band more tightly about said surface, a movable element engageable with the other end of said band effective upon predetermined movement to tend to unwind said band to release the grip thereof upon said surface, and remotely controlled fluid-operated means for actuating said movable element to tend to unwind the band, said means including a member disposed adjacent said movable element and engageable therewith when fluid pressure is exerted thereon to cause said predetermined movement of said element, and means for applying fluid pressure to said member.

3. A device for controlling the relative movement of two elements of a mechanical system, said device comprising a threaded shaft journalled on one of said two elements, said shaft having a cylindrical surface, a nut carried on the threaded portion of the shaft and connected to the other of said two elements, movement of one of said elements toward or away from the other being effective to move said nut axially of said shaft and cause rotation of said shaft, a brake element surrounding said cylindrical surface so as to restrain rotation of said shaft, said brake element being releasable incident to movement of a given portion thereof in a predetermined direction, and means for selectively releasing said brake comprising a lever pivotally mounted adjacent said brake and engageable with said given portion thereof, rocking of said lever in a given direction being effective to cause said predetermined movement of said portion of said brake, means for rocking said lever including an inflatable bladder disposed adjacent said lever and engageable therewith when inflated to cause rocking thereof, and means remote from said bladder for inflating the same.

4. In an adjustable bed having a body-supporting section movable relative to the remainder of the bed, a device for regulating the relative movement of the section comprising two members so mechanically interengaged that linear motion of one member produces rotary motion of the other, said rotary member being journalled on one of said section and the remainder of the bed and having a cylindrical surface, the other of said members being connected to the other of said section and remainder of the bed, a brake element surrounding said cylindrical surface of said rotary member, said brake element comprising a wire helix snugly engaging said surface, means engaging an end of said helix to anchor the same against rotation and to cause the rotation of said surface to increase the grip of the helix, a movable element engageable with the other end of the helix to tend to unwind the same to release the grip of the helix upon said surface, and a manually controlled operator for actuating said movable element to tend to unwind the helix.

5. In an adjustable bed having a body-supporting section movable relative to the remainder of the bed, a device connected between said body-supporting section and the remainder of the bed for regulating movement of said section, said device comprising two members, one of which is caused to move linearly incident to pivotal movement of said section and the other of which is threadedly engaged with said one member so as to be caused to rotate when said one member so moves, said other member having a cylindrical surface, a brake element for controlling the rotation of said other member and including a helically wound band of resilient material disposed about said cylindrical surface so as to snugly engage the same, means engaging an end of said band to anchor the same against rotation and to cause rotation of said surface to wind said band more tightly about said surface, a movable element engageable with the other end of said band to tend to unwind said band to release the grip thereof upon said surface, and a manually controlled operator for actuating said movable element to tend to unwind the band.

6. In an adjustable bed having an underframe on which a body-supporting section is pivotally mounted, an extensible and contractible strut connected between said section and said underframe such that movement of said section causes extension and contraction of said strut, said strut comprising two members threadedly interengaged so that extension and contraction of said strut produces rotary motion of one of said members, said rotary member having a cylindrical surface, a brake element for controlling the rotation of said rotary member and including a helically wound band of resilient material disposed about said cylindrical surface so as to snugly engage the same, means engaging an end of said band to anchor the same against rotation and to cause rotation of said surface to wind said band more tightly above said surface, a movable element engageable with the other end of said band to tend to unwind said band to release the grip thereof upon said surface, and a manually controlled operator for actuating said movable element to tend to unwind the band.

7. In an adjustable bed having an underframe on which a body-supporting section is pivotally mounted, a device connected between said body-supporting section and said underframe for regulating pivotal movement of said section, said device comprising a threaded shaft having a cylindrical surface, a nut carried on the threaded portion of said shaft, pivotal movement of said section being effective to move said nut axially of said shaft and cause rotation of said shaft, a brake element for controlling the rotation of said shaft including a helically wound band of resilient material disposed about said cylindrical surface so as to snugly engage the same, means engaging an end of said band to anchor the same against rotation and to cause rotation of said surface to wind said band more tightly about said surface, a movable element engageable with the other end of said band to tend to unwind said band to release the grip thereof upon said surface, and a manually controlled operator for actuating said movable element to tend to unwind the band.

8. In an adjustable bed having an underframe on which a body-supporting section is pivotally mounted, an extensible and contractible strut connected between said body-supporting section and said underframe such that pivotal movement of said section causes extension and contraction of said strut, said strut being adapted to regulate the pivotal movement of said section and comprising a threaded shaft having a cylindrical surface, a nut carried on the threaded portion of said shaft, extension and contraction of said strut being effective to move said nut axially of said shaft and cause rotation thereof, a brake element for controlling the rotation of said shaft including a pair of helically wound bands of resilient material disposed about said cylindrical surface so as to snugly engage the same, the relative disposition of said bands being such that each advances along said surface in a direction opposite to that of the other, means engaging an end of each of said bands to anchor the same against rotation and to cause rotation of said surface to wind said bands more tightly about said surface, a movable element engageable with the other end of each of said bands to tend to unwind the same to release the grip thereof upon said surface, and a manually controlled operator for actuating said movable element to tend to unwind the bands.

9. In an adjustable bed having an underframe on which a body-supporting section is pivotally mounted, an extensible and contractible strut connected between said body-supporting section and said underframe such that pivotal movement of said section causes extension and contraction of said strut, said strut being adapted to regulate the pivotal movement of said section and comprising a threaded shaft having a cylindrical surface, a nut carried on the threaded portion of said shaft, extension and contraction of said strut being effective to move said nut axially of said shaft and cause rotation thereof, a brake element for controlling the rotation of said shaft including a helically wound band of resilient material disposed about said cylindrical surface so as to snugly engage the same, means engaging an end of said band to anchor the same against rotation and to cause rotation of said surface to wind said band more tightly about said surface, a movable element engageable with the other end of said band effective upon predetermined movement to tend to unwind said band to release the grip thereof upon said surface, and remotely controlled fluid-operated means for actuating said movable element to tend to unwind the band, said means including a member disposed adjacent said movable element and engageable therewith when fluid pressure is exerted thereon to thereby cause said predetermined movement of said element, and means for applying fluid pressure to said member.

References Cited by the Examiner
UNITED STATES PATENTS

| | | | |
|---|---|---|---|
| 1,362,990 | 12/1920 | Gilman | 188—67 |
| 2,579,305 | 12/1951 | Cushman | 297—361 |
| 2,651,055 | 9/1953 | Billet et al. | 5—75 |
| 2,658,209 | 11/1953 | Travis | 5—66 |
| 2,750,994 | 6/1956 | Howell | 297—375 |
| 2,769,182 | 11/1956 | Nunlist | 5—68 |
| 2,809,721 | 10/1957 | Knights | 188—67 |
| 3,007,194 | 11/1961 | Griswold | 188—67 |
| 3,046,055 | 7/1962 | Martens | 297—361 |

FOREIGN PATENTS

| | | |
|---|---|---|
| 839,310 | 6/1960 | Great Britain. |
| 123,626 | 12/1927 | Switzerland. |

FRANK B. SHERRY, *Primary Examiner.*